July 13, 1926.

F. E. SMOOTS

AERIAL TOY

Filed Sept. 30, 1925

1,592,749

Frank E. Smoots,
INVENTOR

BY Victor J. Evans
ATTORNEY.

WITNESS:

Patented July 13, 1926.

1,592,749

UNITED STATES PATENT OFFICE.

FRANK E. SMOOTS, OF ZINCVILLE, OKLAHOMA.

AERIAL TOY.

Application filed September 30, 1925. Serial No. 59,607.

This invention relates to aerial toys and embodies among other features a socket-like handle adapted to receive a shank which supports at one end a plurality of blades, the shank being adapted to be rapidly and quickly rotated in order to be projected from the handle with a whirling motion, the invention residing in the construction, combination and arrangement of parts as clamed.

In the drawing forming part of this application, like numerals of reference indicate similar parts in the several views and wherein:—

Figure 1:
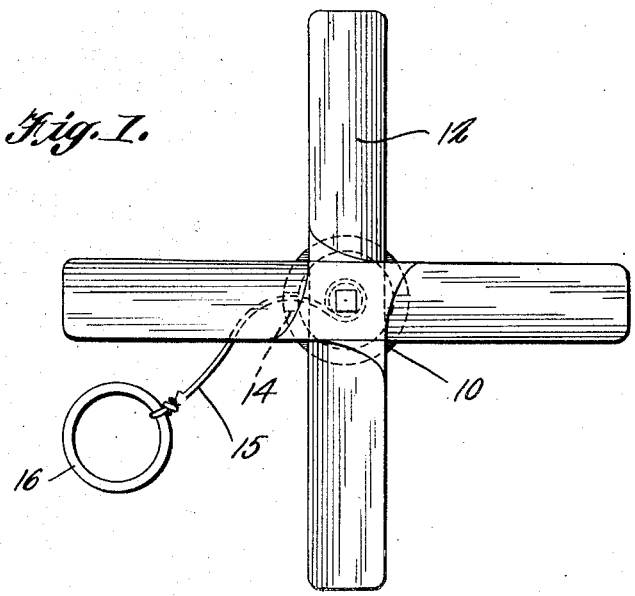
Figure 1 is a top plan view of the toy forming the subject matter of the invention.
Figure 2:
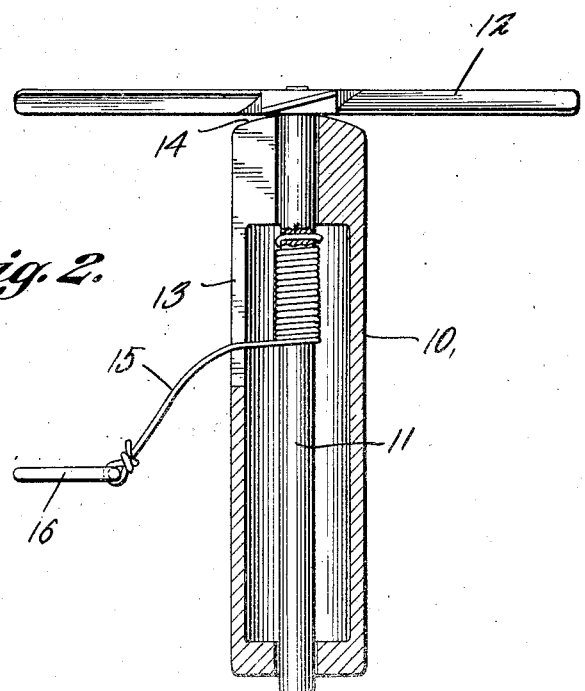
Figure 2 is a view in elevation with the socket-like handle in section.

Referring to the drawing in detail 10 represents a socket-like handle which is preferably constructed of wood, although any other suitable material may be employed, which handle is provided with a vertical bore to receive the shank 11 in the manner clearly illustrated in Figure 2. This shank is loosely fitted in the socket-like handle inasmuch as it is adapted to be both quickly and rapidly rotated in order to project the shank 11 from the handle into the air with a well known motion. The shank 11 supports at one end a plurality of blades 12 angularly disposed relatively. The handle 10 is provided at one side with a slot 13 which extends throughout a portion of the length of the handle, and also extends across one end thereof as at 14, the purpose of this substantially L-shaped slot being to permit the shank 11 together with the cord or flexible element 15 to be properly inserted within the handle 10. This cord or flexible element has one end threaded through an opening in the shank 11 as clearly shown in Figure 2, and the flexible element subsequently wound about the shank, the free end of the cord or flexible element projecting through the slot 13 and preferably having associated therewith a finger ring or the like at 16. The cord or flexible element can be wound about the shank 11 prior to its insertion within the handle 10, or it may be only threaded through the shank 11, the latter placed within the handle 10, whereupon the shank can be rotated through the instrumentality of the blades 12 in order to wind the flexible element 15 about the shank in the manner shown in Figure 2. However, after the parts have been arranged in the manner shown in Figure 2, it is only necessary to give the cord or flexible element 15 a quick pull in order to rotate the shank 11 in a manner which causes it to be projected from the handle 10 into the air with a whirling motion as will be readily understood. The invention is very simple in construction, can be manufactured and sold at a very small cost, and is designed to afford considerable pleasure and amusement especially to young folks.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A toy of the character described comprising a socket-like handle having a substantially inverted L-shaped slot at one side and end thereof, a shank adapted to be received by said handle, angular shaped blades radiating from one end of the shank and a flexible element having one end threaded through an opening in the shank, and subsequently wound about the latter and adapted to be quickly unwound from the shank through said slot as and for the purpose specified.

In testimony whereof I affix my signature.

FRANK E. SMOOTS.